United States Patent [19]

Abe et al.

[11] Patent Number: 5,057,478
[45] Date of Patent: Oct. 15, 1991

[54] METHOD OF PRODUCING A COMPOSITE MATERIAL COMPRISING A PEROVSKITE COMPLEX COMPOUND HAVING AN α-OLEFIN POLYMER DEPOSITED THEREON

[75] Inventors: Kazunobu Abe; Takeshi Fukunaga, both of Osaka, Japan

[73] Assignee: Sakai Chemical Industry Co., Ltd., Osaka, Japan

[21] Appl. No.: 482,495

[22] Filed: Feb. 21, 1990

[30] Foreign Application Priority Data

Feb. 21, 1989 [JP] Japan .................................. 1-041321

[51] Int. Cl.$^5$ ............................................. B01J 31/06
[52] U.S. Cl. ...................................... 502/159; 502/525
[58] Field of Search ............... 502/150, 525, 340, 306, 502/304, 302, 308, 309, 310, 349, 350, 352, 159, 151

[56] References Cited

U.S. PATENT DOCUMENTS

| | | | |
|---|---|---|---|
| 2,976,253 | 3/1961 | Edwards | 502/159 |
| 3,905,918 | 9/1975 | Mai et al. | 502/525 X |
| 3,922,204 | 11/1975 | Tseung et al. | 502/303 X |
| 3,968,412 | 7/1976 | Girard et al. | 423/598 X |
| 4,055,513 | 10/1977 | Wheelock | 502/303 |
| 4,126,580 | 11/1978 | Louder | 502/303 |
| 4,151,123 | 4/1979 | McCann, III | 502/525 X |
| 4,418,008 | 11/1983 | Schucker et al. | 502/430 |
| 4,452,953 | 6/1984 | Benedikt | 525/344 |
| 4,636,378 | 1/1987 | Pastor et al. | 502/525 X |
| 4,670,243 | 6/1987 | Wilson et al. | 423/598 |
| 4,770,765 | 9/1988 | Bartek et al. | 502/525 X |
| 4,791,085 | 12/1988 | Groenenboom | 502/68 |

*Primary Examiner*—W. J. Shine
*Assistant Examiner*—Douglas J. McGinty
*Attorney, Agent, or Firm*—Wenderoth, Lind & Ponack

[57] ABSTRACT

An α-olefin polymerization catalyst which comprises a perovskite type complex compound comprising a perovskite type compound represented by the formula $$ABO_3$$

wherein A is at least one element selected from the group consisting of alkaline earth metals and Pb, and B is at least one element selected from the group consisting of Ti, Zr, Hf and Sn; the complex compound further containing at least one oxide of element selected from the group consisting of rare earth elements, transition elements, Bi, Sb and Sn doped in the perovskite type compound in an amount of 0.1-3 mol %.

A composite material which comprises the catalyst having an α-olefin polymer deposited thereon, is useful as, for example, a dielectric ceramic material.

5 Claims, 2 Drawing Sheets

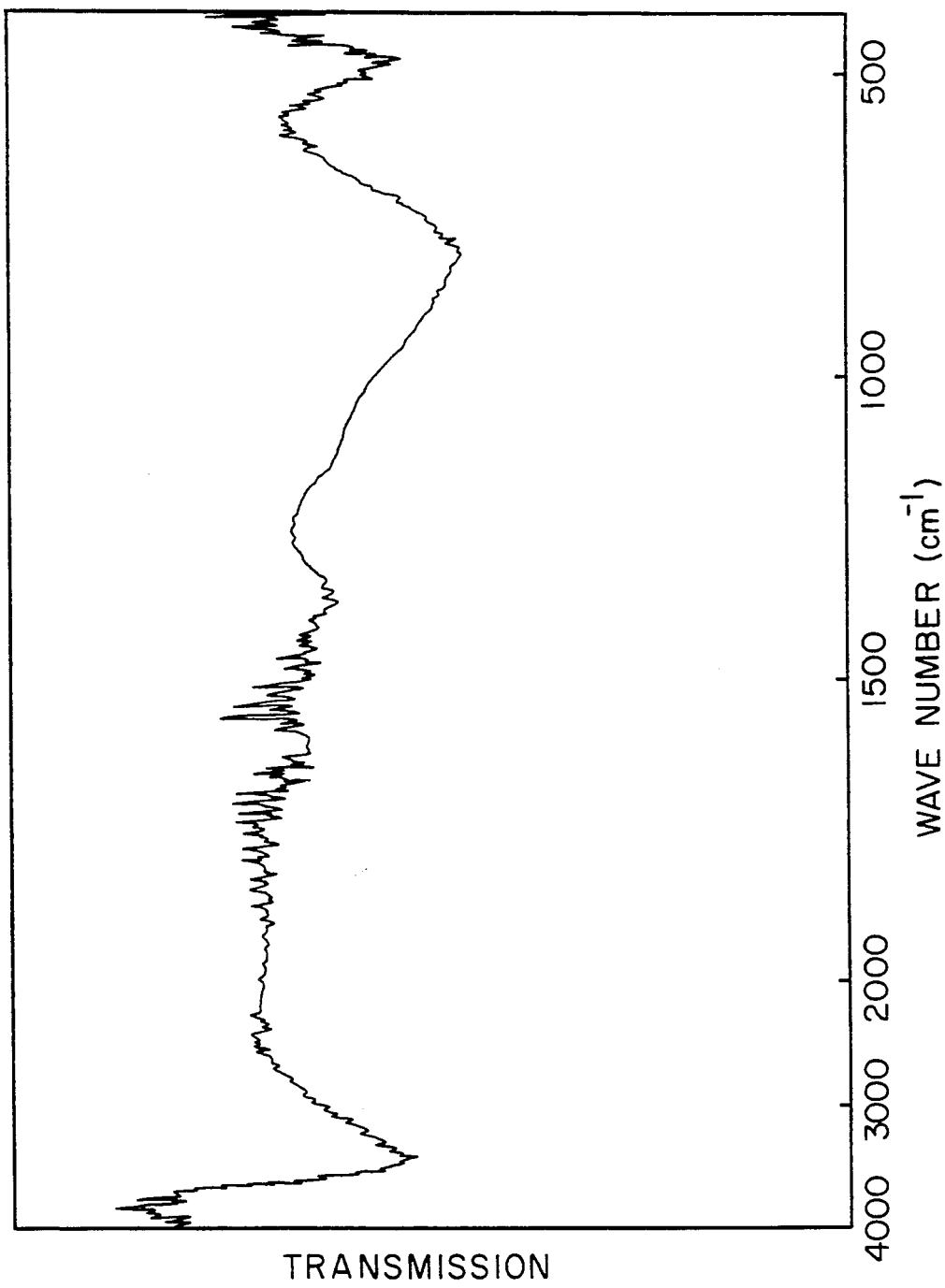

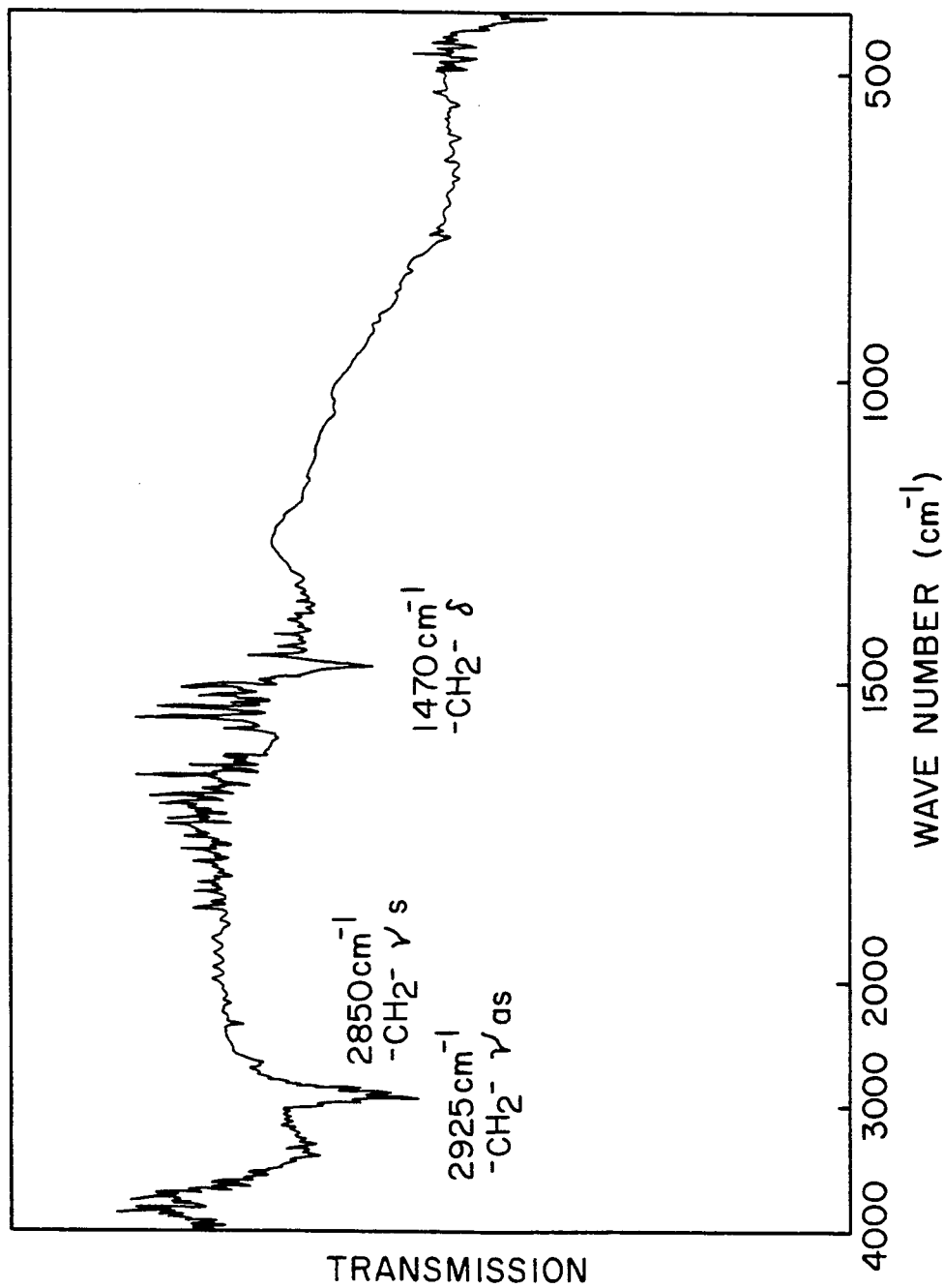

METHOD OF PRODUCING A COMPOSITE MATERIAL COMPRISING A PEROVSKITE COMPLEX COMPOUND HAVING AN α-OLEFIN POLYMER DEPOSITED THEREON

This invention relates to an α-olefin polymerization catalyst which comprises a perovskite type complex compound and to a composite material composed of the catalyst having α-olefin polymers deposited thereon useful, for example, as a ceramic dielectric material.

There are already known a number of α-olefin polymerization catalysts such as chromium oxides, molybdenum oxides or Ziegler catalysts. As well known, these catalysts are intended to provide α-olefin polymers in high polymerization yields. However, no α-olefin polymerization catalyst has been heretofore known which, when put into contact with an α-olefin, not only functions as a polymerization catalyst but also provides a composite material composed of the catalyst having α-olefin polymers deposited thereon. Such a composite material is useful, for example, as high performance electronic materials such as condensers, piezoelectric materials or ceramic dielectrics.

It is, therefore, an object of the invention to provide a novel α-olefin polymerization catalyst.

It is a further object of the invention to provide a composite material useful as a high performance ceramic material.

In accordance with the invention, there is provided an α-olefin polymerization catalyst which comprises a perovskite type complex compound comprising a perovskite type compound represented by the formula $$ABO_3$$

wherein A is at least one element selected from the group consisting of alkaline earth metals and Pb, and B is at least one element selected from the group consisting of Ti, Zr, Hf and Sn; the complex compound further containing at least one oxide of element selected from the group consisting of rare earth elements, transition elements, Bi, Sb and Sn doped in the perovskite type compound in an amount of 0.1–3 mol %.

Further in accordance with the invention, there is provided a composite material comprising a perovskite type complex compound having an α-olefin polymer deposited thereon, wherein the perovskite type complex compound comprises a perovskite type compound represented by the formula $$ABO_3$$

wherein A is at least one element selected from the group consisting of alkaline earth metals and Pb, and B is at least one element selected from the group consisting of Ti, Zr, Hf and Sn; the complex compound further containing at least one oxide of element selected from the group consisting of rare earth elements, transition elements, Bi, Sb and Sn doped in the perovskite type compound in an amount of 0.1–3 mol %.

There is also provided a method of producing a composite material comprising a perovskite type complex compound having an α-olefin polymer deposited thereon, which comprises: polymerizing an α-olefin in the presence of a perovskite type complex compound comprising a perovskite type compound represented by the formula $$ABO_3$$

wherein A is at least one element selected from the group consisting of alkaline earth metals and Pb, and B is at least one element selected from the group consisting of Ti, Zr, Hf and Sn; the complex compound further containing at least one oxide of element selected from the group consisting of rare earth elements, transition elements, Bi, Sb and Sn doped in the perovskite type compound in an amount of 0.1–3 mol %.

FIG. 1 is an FT-IR (Fourier Transformation Infrared Spectrophotometry) spectrum of one of the catalysts of the invention prior to use; and FIG. 2 is an FT-IR spectrum of the above catalyst after use in the polymerization of ethylene.

The perovskite type compound is in general such a compound as has the same crystal structure as perovskite. It is already known that the molding and sintering the perovskite type compound provide dielectric ceramics which have dielectricity, piezoelectricity and semiconductivity, and such dielectric ceramics have recently found wide applications as electronic elements or parts such as condensers, electric wave filters, ignition elements or thermistor in electronic appliances.

In general, the perovskite type compound is produced by a calcining method wherein a carbonate or an oxide of Mg, Ca, Sr, Ba or Pb is admixed with an oxide of Ti, Zr, Hf or Sn, the resultant mixture is calcined at temperatures of about 1000° C., wet milled, filtered and dried. A wet method is also known which includes, for example, a hydrothermal method, an alkoxide method and an organic carboxylate method, as described in Kogyo Kagaku Zasshi, Vol. 71, No. 1, pp. 114–118 (1968) or Kino Zairyo, 1982, Dec., pp. 1–8.

The perovskite type complex compound of the invention may be produced by either method. In accordance with the calcining method, a mixture of a carbonate, a hydroxide, an oxide or their precursors of at least one A element selected from the group consisting of alkaline earth metals and Pb, an oxide of at least one element selected from the group consisting of rare earth elements, transition elements, Bi, Sb and Sn (which will be often referred to as doping elements hereinafter) in an amount of 0.1–3 mol %, and an oxide of at least one B element selected from the group consisting of Ti, Zr, Hf and Sn is calcined at temperatures of 700°–1300° C., preferably of 800°–1200° C., wet milled, filtered and dryed. The A elements and B elements are used stoichiometrically to provide the perovskite type compound as represented by the formula set out hereinbefore, and the same hereinafter.

The rare earth element used is not specifically limited, but Nd, Y, Dy, Ce or Sm is preferred, for example. The transition element used is also not specifically limited, but Ti, Nb, Mo, W or Cr is preferred, for example.

In turn, in accordance with the hydrothermal method, a mixture of a hydroxide of at least one A element, a hydroxide of at least one doping element and a hydroxide of at least one B element is subjected to a hydrothermal reaction. The above mentioned mixtures of the hydroxides are prepared preferably by a co-precipitating method which is per se well known.

The hydrothermal reaction is also already known, as described in the before mentioned Kogyo Kagaku Zasshi or Bull. Chem. Soc., Japan, 51(6), pp. 1739–1742 (1978), and refers to a treatment to heat a mixture of hydroxides under alkaline conditions in an aqueous medium. More specifically, the hydrothermal reaction is carried out in such a manner that a mixture of hydroxides is heated at temperatures below the critical temperatures of the aqueous medium used. The mixture of hydroxides is by nature alkaline, but the mixture may be heated in the presence of an alkali added.

The temperature at which the hydrothermal reaction is carried out may range from 100° C. to temperatures below the critical temperatures of the aqueous medium used. When the temperature is less than 100° C., the hydrothermal reaction does not proceed sufficiently thereby failing to provide the desired perovskite type complex compound of the invention. Although, as the higher the reaction temperature, the higher the reaction velocity, but the higher the reaction temperature, the more expensive the installation and energy costs needed, so that the reaction temperature is preferably in the range of 100°-300° C. from the practical standpoint.

After the hydrothermal reaction, the reaction mixture in the form of slurry is filtered to collect solids, and the solids are washed and dried, to provide the perovskite type complex compound useful as an α-olefin polymerization catalyst is obtained.

When the metal alkoxide method is employed, a mixture of an alkoxide of at least one A element, an alkoxide of at least one doping element and an alkoxide of at least one B element is mixed with water to hydrolyze the alkoxides, and then, if necessary, heated. Alternatively, one or two alkoxides of the A elements, B elements or doping elements are first hydrolyzed with the hydroxide of the other elements and then, if necessary, heated.

Finally in accordance with the organic carboxylate method, a mixture of a salt of at least one A element, a salt of at least one doping element and a salt of at least one B element is reacted with an organic carboxylic acid to provide a water insoluble complex salt of an organic carboxylic acid such as oxalic acid or citric acid containing the A element, doping element and B element, and the complex salt is heat decomposed at temperatures of about 400°-900° C.

Depening upon the conditions, the wet method may form a precursor which provides a perovskite type complex compound by subsequent heating. Alternatively, the precursor provides a perovskite type complex compound when it is calcined together with a perovskite type complex compound produced by the calcining method.

As set forth above, the α-olefin polymerization catalyst of the invention is obtained as a perovskite type complex compound either by the calcining method or the wet method. Since the complex compound has a higher catalyst activity as it has a larger specific surface area, it is desired that the complex compound has a specific surface area of not less than 5 m²/g. A mixture of perovskite type complex compounds produced by different methods is also useful as an α-olefin polymerization catalyst.

The particle size of the perovskite type complex compound as the catalyst is not specifically limited, but it is preferably not more than 0.5 μm, when the resultant composite material of the catalyst having α-olefin polymers deposited thereon is made use of, for example, as ceramic dielectric material, as will be described in more detail hereinafter.

The polymerization of an α-olefin using the catalyst is usually carried out in such a manner that an α-olefin is introduced into a reaction vessel containing the catalyst, although the method is not limited to the above exemplified method. The polymerization may be carried out either by a solution, suspension or gas polymerization method, or either by a continuous or a batchwise manner. If desired, an inert hydrocarbon solvent such as butane, hexane, heptane, benzene or toluene may be used in the polymerization, although the solvent usable is not limited to the above exemplified.

The polymerization is carried out advantageously at 1–100 atmospheric pressures at temperatures usually of −30° C. to 200° C., preferably of 20° C. to 150° C. The polymerization time may vary depending upon the catalysts or α-olefins used, but it is usually in the range of five minutes to 100 hours, preferably of 30 minutes to 20 hours. Hydrogen may be used to control the molecular weight of the resultant α-olefin polymers.

The polymerization catalyst of the invention is in particular useful for polymerization of α-olefins of 2–10 carbons such as ethylene, propylene, 1-butene, 1-pentene, 1-hexene, 4-methyl-1-pentene or a mixture of two or more of these.

As a further aspect of the invention, there is provided a composite material of the catalyst having an α-olefin polymer deposited thereon. The composite material is obtained by putting an α-olefin into contact with a powder of the catalyst under agitation in the absence of a solvent, so that the resultant α-olefin polymer deposits on the catalyst particles. The α-olefin polymer may be a homo or copolymer of an α-olefin of 2–10 carbon atoms. As set forth hereinbefore, the sintering of the perovskite type compound provides a dielectric, piezoelectric and semiconductive ceramic material. Since the composite material of the invention has a very high specific resistivity on account of the α-olefin polymer disposited thereon, it provides a very high performance dielectric ceramic materials and it is highly dispersible in organic materials.

The invention will now be described with reference to examples, however, the invention is not limited to the examples.

PREPARATION OF CATALYSTS

Example 1

Titanium tetrachloride was dissolved in water to an aqueous solution of titanic acid (16.3% or 0.5 mol as Ti). A 25% aqueous ammonia was added to the solution under stirring to adjust the pH at 7.5. After 20 minute stirring, the pH was adjusted again at 7.5, and the resultant titanic acid cake was filtered and washed.

The titanic acid (0.36 mol as Ti) was placed in an autoclave together with an aqueous solution of barium hydroxide (0.352 mol as Ba) to provide a slurry, and the slurry was subjected to hydrothermal reaction at 200° C. over five hours. After cooling, solids were collected by filtration, washed with water, dried at 150° C. overnight, and sample milled, to provide an α-olefin polymerization catalyst 1 composed of barium titanate (BaTiO$_3$) having 2.27 mol % of Ti doped therein.

Example 2

Ammonium molybdate ((NH$_4$)$_6$Mo$_7$O$_{24}$. 4H$_2$O, 0.0005 mol as Mo) was dissolved in 65 ml of a 25% aqueous ammonia, and the resultant solution was added to the same titanic acid solution (0.5 mol as Ti) as in the Example 1. The solution was then added to water together with a 25% aqueous ammonia while adjusting the pH at 7.5. The resultant titanic acid cake containing Mo was collected by filtration and washed with water.

The titanic acid cake containing Mo (0.36 mol as Ti) was placed in an autoclave together with an aqueous solution of barium hydroxide (0.36 mol as Ba) to provide a slurry, and the slurry was subjected to hydrothermal reaction at 200° C. over five hours. After cooling, solids were collected by filtration, washed with water, dried at 150° C. overnight, and a sample milled, to provide a catalyst 2 composed of barium titanate ($BaTiO_3$) having 0.1 mol % of Mo doped therein.

Example 3

Ammonium molybdate was used in an amount of 0.0015 mol as Mo, and otherwise in the same manner as in the Example 2, a catalyst 3 was prepared which was composed of barium titanate ($BaTiO_3$) having 0.3 mol % of Mo doped therein.

Example 4

Ammonium molybdate was used in an amount of 0.005 mol as Mo, and otherwise in the same manner as in the Example 2, a catalyst 4 was prepared which was composed of barium titanate ($BaTiO_3$) having 1.0 mol % of Mo doped therein.

Example 5

Ammonium molybdate was used in an amount of 0.010 mol as Mo, and otherwise in the same manner as in the Example 2, a catalyst 5 was prepared which was composed of barium titanate ($BaTiO_3$) having 2.0 mol % of Mo doped therein.

Example 6

Niobium pentachloride ($NbCl_5$, 0.0015 mol as Nb) was dissolved in 30 ml of methanol, and the resultant solution was added to the same titanic acid solution (0.5 mol as Ti) as in the Example 1. The solution was then added to water together with a 25% aqueous ammonia while adjusting the pH at 7.5. The resultant titanic acid cake containing Nb was collected by filtration and washed with water.

The titanic acid cake containing Nb (0.36 mol as Ti) was placed in an autoclave together with an aqueous solution of barium hydroxide (0.36 mol as Ba) to provide a slurry, and the slurry was subjected to hydrothermal reaction at 200° C. over five hours. After cooling solids were collected by filtration, washed with water, dried at 150° C. overnight, and sample milled, to provide a catalyst 6 composed of barium titanate ($BaTiO_3$) having 0.3 mol % of Nb doped therein.

Example 7

Antimony oxide ($Sb_2O_3$, 0.0030 mol as Sb) was dissolved in 20 ml of concentrated hydrochloric acid, and the resultant solution was added to the same titanic acid solution (0.5 mol as Ti) as in the Example 1. The solution was then added to water together with a 25% aqueous ammonia while adjusting the pH at 7.5. The resultant titanic acid cake containing Sb was collected by filtration and washed with water.

The titanic acid cake containing Sb (0.36 mol as Ti) was placed in an autoclave together with an aqueous solution of barium hydroxide (0.36 mol as Ba) to provide a slurry, and the slurry was subjected to hydrothermal reaction at 200° C. over five hours. After cooling, solids were collected by filtration, washed with water, dried at 150° C. overnight, and sample milled, to provide a catalyst 7 composed of barium titanate ($BaTiO_3$) having 0.6 mol % of Sb doped therein.

Example 8

Cerium chloride ($CeCl_3.7H_2O$, 0.0015 mol as Ce) was used in place of ammonium molybdate, and otherwise in the same manner as in the Example 2, a catalyst 8 was prepared which was composed of barium titanate ($BaTiO_3$) having 0.3 mol % of Ce doped therein.

Example 9

Chromic chloride ($CrCl_3.6H_2O$, 0.0015 mol as Cr) was used in place of ammonium molybdate, and otherwise in the same manner as in the Example 2, a catalyst 9 was prepared which was composed of barium titanate ($BaTiO_3$) having 0.3 mol % of Cr doped therein.

Example 10

Bismuth nitrate ($Bi(NO_3)_3.5H_2O$, 0.0015 mol as Bi) was used in place of ammonium molybdate, and otherwise in the same manner as in the Example 2, a catalyst 10 was prepared which was composed of barium titanate ($BaTiO_3$) having 0.3 mol % of Bi doped therein.

Example 11

Yttrium oxide $Y_2O_3$, 0.0015 mol as Y) was used in place of antimony oxide, and otherwise in the same manner as in the Example 7, a catalyst 11 was prepared which was composed of barium titanate ($BaTiO_3$) having 0.3 mol % of Y doped therein.

Example 12

Stannous chloride ($SnCl_2.2H_2O$, 0.0015 mol as Sn) was used in place of ammonium molybdate, and otherwise in the same manner as in the Example 2, a catalyst 12 was prepared which was composed of barium titanate ($BaTiO_3$) having 0.3 mol % of Sn doped therein.

Example 13

Yttrium oxide ($Y_2O_3$, 0.0015 mol as Y) was dissolved in 20 ml of concentrated hydrochloric acid, and the resultant solution was added to the same titanic acid solution (0.5 mol as Ti) as in the Example 1. The solution was then added to water together with a 25% aqueous ammonia while adjusting the pH at 7.5. The resultant titanic acid cake containing Y was collected by filtration and washed with water.

The titanic acid cake containing Y (0.36 mol as Ti) was placed in an autoclave together with an aqueous solution of strontium hydroxide (0.36 mol as Sr) to provide a slurry and the slurry was subjected to hydrothermal reaction at 200° C. over five hours. After cooling, solids were collected by filtration, washed with water, dried at 150° C. overnight, and sample milled, to provide a catalyst 13 composed of strontium titanate ($SrTiO_3$) having 0.3 mol % of Y doped therein.

Example 14

An aqueous solution containing barium hydroxide (0.288 mol as Ba) and strontium hydroxide (0.0720 mol as Sr) was used in place of the aqueous strontium hydroxide solution, and otherwise in the same manner as in the Example 13, a catalyst 14 was prepared which was composed of barium strontium titanate $(Ba_{0.8}Sr_{0.2})_2$ having 0.3 mol % of Y doped therein.

Example 15

An aqueous solution of calcium hydroxide (0.36 mol as Ca) was used in place of the aqueous strontium hydroxide solution, and otherwise in the same manner as in the Example 13, a catalyst 15 was prepared which was composed of calcium titanate ($CaTiO_3$) having 0.3 mol % of Y doped therein.

Example 16

Litharge (PbO, 0.1 mol as Pb) and yttrium oxide ($Y_2O_3$, 0.0015 mol as Y) were dissolved in 20 ml of concentrated hydrochloric acid, and the resultant solution was added to the same titanic acid solution (0.5 mol as Ti) as in the Example 1. The solution was then added to water together with a 25% aqueous ammonia while adjusting the pH at 7.5. The resultant titanic acid cake containing Pb and Y was collected by filtration and washed with water.

The titanic acid cake containing Pb and Y (0.36 mol as Ti) was placed in an autoclave together with an aqueous solution of barium hydroxide (0.288 mol as Ba) to provide a slurry and the slurry was subjected to hydrothermal reaction at 200° C. over five hours. After cooling, solids were collected by filtration, washed with water, dried at 150° C. overnight, and sample milled, to provide a catalyst 16 composed of barium lead titanate ($Ba_{0.8}Pb_{0.2}TiO_3$) having 0.3 mol % of Y doped therein.

Example 17

Zirconyl chloride ($ZrOCl_z.8H_2O$, 0.5 mol as Zr) was dissolved in 400 ml of water, and the resultant solution was added to the same titanic acid solution (0.0005 mol as Ti) as in the Example 1. The solution was then added to water together with a 25% aqueous ammonia while adjusting the pH at 7.5. The resultant zirconic acid cake containing Ti was collected by filtration and washed with water.

The zirconic acid cake containing Ti (0.36 mol as Zr) was placed in an autoclave together with an aqueous solution of barium hydroxide (0.36 mol as Ba) to provide a slurry and the slurry was subjected to hydrothermal reaction at 200° C. over five hours. After cooling, solids were collected by filtration, washed with water, dried at 150° C. overnight, and sample milled, to provide a catalyst 17 composed of barium zirconate ($BaZrO_3$) having 0.1 mol % of Ti doped therein.

Example 18

An aqueous solution of stannous chloride ($SnCl_z.2H_2O$, 0.5 mol as Sn) was used in place of the aqueous zirconyl chloride solution, and otherwise in the same manner as in the Example 17, a catalyst 18 was prepared which was composed of barium stannate ($BaSnO_3$) having 0.1 mol % of Ti doped therein.

Example 19

A mixture of high purity, finely divided titanium oxide (0.253 mol as Ti), high purity, finely divided barium carbonate (0.253 mol as Ba) and yttrium oxide (0.000759 mol as Y) was admixed with 64 g of acetone, and the mixture was ball milled with a polyimide resin ball mill provided with zirconia balls of 5 mm in diameter for three hours. The mixture was filtered to remove the balls, concentrated to dryness and calcined at 1200° C. for two hours in an electric oven. After cooling, the calcined mixture was pulverized to provide a catalyst 19 composed of barium titanate ($BaTiO_3$) having 0.3 mol % of Y doped therein.

Example 20

Barium chloride (0.5 mol as Ba) was dissolved in the same titanic acid solution (0.5 mol as Ti) as in Example 1.

A solution of yttrium oxide (0.0015 mol as Y) in hydrochloric acid was added to the above solution, and the resultant solution was then added to an aqueous solution of oxalic acid (1 mol as oxalic acid) to provide a slurry containing precipitates of titanium barium oxyoxalate ($BaTiO(C_2O_4)_2 \cdot 4H_2O$). The slurry was neutralized with a 25% aqueous ammonia to a pH of 7.5, and the precipitates were collected by filtration, washed with water, dried and calcined at 800° C. for two hours. After cooling, the calcined mixture was pulverized to provide a catalyst 20 composed of barium titanate ($BaTiO_3$) having 0.3 mol % of Y doped therein.

Example 21

Titanium isopropoxide ($Ti(OC_3H_7)_4$, 0.5 mol as Ti), barium propoxide ($Ba(OC_3H_7)_4$, 0.5 mol as Ba) and yttrium propoxide ($Y(OC_3H_7)_4$, 0.0015 mol as Y) were all dissolved in 100 ml of isopropanol, and to the resultant solution were added 300 ml of water, followed by stirring at 70° C. for one hour, to hydrolyze the propoxides.

The resultant cake was filtered, washed, dried and calcined at 1000° C. for two hours, and pulverized after cooling, to provide a catalyst 21 composed of barium titanate ($BaTiO_3$) having 0.3 mol % of Y doped therein.

POLYMERIZATION OF α-OLEFINS

Example 22

A catalyst powder was heated at 400°-600° C. for one to two hours in air preferably under reduced pressures, cooled and then placed in a polyimide resin ball mill provided with zirconia balls of 10 mm in diameter, followed by degassing for 30 minutes.

An α-olefin monomer gas was introduced into the ball mill to an inside pressure of 2 Kg/cm², and the monomer was polymerized overnight while pulverizing the catalyst with the balls. Then, the monomer was again introduced into the ball mill to an inside pressure of 2 Kg/cm², and the reaction was carried out in the same manner.

In this manner, the monomer was introduced into the ball mill three times, and the reaction was carried out. Then, the ball mill was degassed and the catalyst was taken out of the ball mill. TG and FT-IR analysis were effected on the catalyst powder to illustrate that polymers were produced on the catalyst. Ethylene was polymerized in the presence of the catalysts 1-21. Propylene was also polymerized using the catalyst 11 and 13. The results are shown in the Table 1.

In the Table 1, TG weight decrese is weight decrease of a catalyst when heated to 500° C. at a rate of 5° C. per minute after the polymerization, that is, the amount substantially corresponding to the weight of polymer produced on the catalyst. Yield is defined as (amount of polymer produced/amount of catalyst used)×100 (%).

FIG. 1 is an FT-IR spectrum of catalyst 15 as it stands initially and FIG. 2 is an FT-IR spectrum of the same catalyst after polymerization of ethylene in the presence thereof. In FIG. 2 are found chacteristic absorption to polyethylene at 2925 cm$^{-1}$ ($-CH_2-\nu_{as}$), 2850 cm$^{-1}$ ($-CH_2-\nu_s$) and 1470 cm$^{-1}$ ($-CH_2-\delta$).

TABLE 1

| Catalyst No. | Polymerization of α-Olefins | | | |
|---|---|---|---|---|
| | TG* Weight Decrease (%) | Catalyst Used (g) | Polymers Produced (g) | Yield (%) |
| 1 | 2.5 | 50 | 1.28 | 2.6 |
| 2 | 9.9 | 50 | 5.49 | 11.0 |
| 3 | 5.3 | 50 | 2.80 | 5.6 |
| 4 | 3.1 | 50 | 1.64 | 3.3 |
| 5 | 2.9 | 50 | 1.49 | 3.0 |
| 6 | 2.2 | 50 | 1.12 | 2.2 |
| 7 | 8.5 | 50 | 4.64 | 9.3 |
| 8 | 7.4 | 50 | 4.00 | 8.0 |
| 9 | 2.7 | 50 | 1.39 | 2.8 |
| 10 | 2.6 | 50 | 1.33 | 2.7 |
| 11 | 10.1 | 50 | 5.62 | 11.2 |
| 12 | 2.5 | 50 | 1.28 | 2.6 |
| 13 | 9.8 | 50 | 5.43 | 10.9 |
| 14 | 8.8 | 50 | 4.82 | 9.6 |
| 15 | 10.0 | 50 | 5.56 | 11.1 |
| 16 | 8.0 | 50 | 4.35 | 8.7 |
| 17 | 1.9 | 50 | 0.97 | 1.9 |
| 18 | 2.0 | 50 | 1.02 | 2.0 |
| 19 | 0.7 | 50 | 0.35 | 0.7 |
| 20 | 1.6 | 50 | 0.81 | 1.6 |
| 21 | 1.1 | 50 | 0.56 | 1.1 |
| 11 | 3.2 | 50 | 1.65 | 3.3 |
| 13 | 3.0 | 50 | 1.55 | 3.1 |

| Catalyst No. | FT-IR Absorption | | |
|---|---|---|---|
| | —CH$_2$— Asymmetric Stretching (2925 cm$^{-1}$) | —CH$_2$— Symmetric Stretching (2850 cm$^{-1}$) | —CH$_2$— Scissoring (1470 cm$^{-1}$) |
| 1 | yes | yes | no |
| 2 | yes | yes | yes |
| 3 | yes | yes | yes |
| 4 | yes | yes | yes |
| 5 | yes | yes | yes |
| 6 | yes | yes | yes |
| 7 | yes | yes | yes |
| 8 | yes | yes | yes |
| 9 | yes | yes | no |
| 10 | yes | yes | no |
| 11 | yes | yes | yes |
| 12 | yes | yes | no |
| 13 | yes | yes | yes |
| 14 | yes | yes | yes |
| 15 | yes | yes | yes |
| 16 | yes | yes | yes |
| 17 | yes | yes | no |
| 18 | yes | yes | no |
| 19 | yes | yes | no |
| 20 | yes | yes | no |
| 21 | yes | yes | no |
| 11 | yes | yes | yes |
| 13 | yes | yes | yes |

*Thermogravimetry

SPECIFIC RESISTIVITY OF CATALYST POWDER

Example 23

A catalyst powder 13 before and after use as a polymerization catalyst was molded into pellets of 20 mm in diameter under a pressure of 1000 Kg/cm$^2$. After measuring the thickness, both surfaces were metal plated with an ion coater, and resistance was measured with an LCR meter by applying an electric voltage of 25 V across the surfaces. The thus obtained specific resistivity is shown in the Table 2.

It is seen that the catalyst powder used for polymerization of ethylene has a much larger specific resistivity due to polyethylene deposited thereon.

TABLE 2

| | Thickness of Pellets (mm) | Resistance (Ω) | Specific Resistivity (Ω · cm) |
|---|---|---|---|
| Initial | 1.201 | 8.45 × 10$^6$ | 2.21 × 10$^8$ |
| After Polymerization | 1.105 | 9.09 × 10$^5$ | 2.58 × 10$^{10}$ |

What is claimed is:

1. A method of producing a composite material comprising a perovskite type complex compound having an α-olefin polymer deposited thereon, which comprises: polymerizing an α-olefin in the presence of a perovskite type complex compound comprising a perovskite type compound represented by the formula $$ABO_3$$

wherein A is at least one element selected from the group consisting of alkaline earth metals and Pb, and B is at least one element selected from the group consisting of Ti, Zr, Hf and Sn; the complex compound further containing at least one oxide of element selected from the group consisting of rare earth elements, transition elements, Bi, Sb and Sn doped in the perovskite type compound in an amount of 0.1-3 mol %.

2. The method as claimed in claim 1 wherein the rare earth element is at least one of Nd, Y, Dy, Ce and Sm, and the transition element is at least one of Ti, Nb, Mo, W and Cr.

3. The method as claimed in claim 1 wherein the perovskite type compound is barium titanate, strontium titanate, barium strontium titanate, barium lead titanate, barium zirconate, barium stannate or calcium titanate.

4. The method as claimed in claim 1 wherein the α-olefin has 2-10 carbons.

5. The method as claimed in claim 4 wherein the α-olefin is ethylene or propylene.

* * * * *